Figure 1:
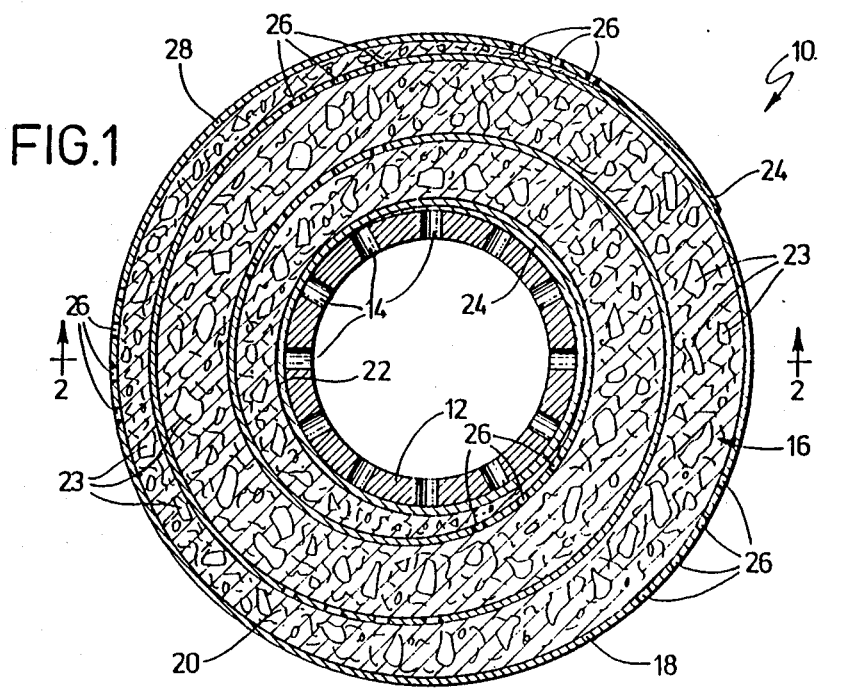

United States Patent [19]

Brownell

[11] Patent Number: 4,877,527

[45] Date of Patent: Oct. 31, 1989

[54] LIQUID FILTER OF SPIRAL WOUND CONSTRUCTION WITH ALTERNATE LAYERS OF A SURFACE AREA MEDIA AND A DEPTH MEDIA

[75] Inventor: Peter Brownell, Providence, R.I.

[73] Assignee: Allied-Signal Inc., Morristown, N.J.

[21] Appl. No.: 62,031

[22] Filed: Jun. 15, 1987

[51] Int. Cl.⁴ .......................................... B01D 27/04
[52] U.S. Cl. ................................... 210/489; 210/496; 210/497.1; 210/497.2; 210/505; 55/487; 55/498; 55/520; 55/527
[58] Field of Search ............... 210/488, 489, 492, 496, 210/497.01, 497.1, 497.2, 503, 505, 509; 55/486, 498, 514, 520, 522, 487, 527

[56] References Cited

U.S. PATENT DOCUMENTS

| | | | |
|---|---|---|---|
| 1,898,027 | 2/1933 | Winslow | 55/486 |
| 2,427,733 | 9/1947 | McCann | 210/494.1 |
| 2,577,169 | 12/1951 | Von Pentz | 210/494.1 |
| 2,742,160 | 4/1956 | Fogwell | 210/494.1 |
| 3,095,370 | 6/1963 | Krogman | 210/494.1 |
| 3,807,570 | 4/1974 | Allan | 210/494.1 |
| 4,032,457 | 6/1977 | Matchett | 210/492 |
| 4,092,246 | 5/1978 | Kummer | 210/497.1 |
| 4,102,785 | 7/1978 | Head et al. | 210/487 |
| 4,160,059 | 7/1979 | Sanejima | 210/504 |
| 4,555,342 | 11/1985 | Grant | 210/493.4 |
| 4,564,376 | 1/1986 | Billiet | 55/486 |

FOREIGN PATENT DOCUMENTS 2095572 10/1982 United Kingdom ............ 210/497.1

Primary Examiner—Richard V. Fisher
Assistant Examiner—Wanda L. Millard
Attorney, Agent, or Firm—Ken C. Decker; W. N. Antonis

[57] ABSTRACT

A liquid filter cartridge includes a centertube and a filtering media wrapped circumferentially about the centertube to provide a spirally wrapped media. The media includes a surface-type filtering medium having a predetermined porosity and a depth-type filtering medium which is disposed between the wraps of the surface-type filtering medium. The surface-type filtering medium is a filtering paper, and the depth-type filtering medium is an air laid batt which includes structural fibers tending to support the surface-type medium and to prevent the latter from collapsing under dynamic flow conditions. The depth-type medium is porous and offers little resistance to fluid flow, so that the liquid to be filtered can easily flow both radially from one of the layers of the surface-type medium to the adjacent layer, and also can flow circumferentially to thereby permit access for the liquid to be filtered over the entire area of the inner wraps of the surface-type medium.

11 Claims, 1 Drawing Sheet

LIQUID FILTER OF SPIRAL WOUND CONSTRUCTION WITH ALTERNATE LAYERS OF A SURFACE AREA MEDIA AND A DEPTH MEDIA

This invention relates to a liquid filter of the type in which the filtering media is wound around the supporting centertube.

Spiral wound filters, in which the filtering media is wound circumferentially around a supporting centertube, have been used for many years. Athough this type of filter performs well and can be manufactured easily at a relatively low cost, such filters have not been widely accepted commercial because their capacity is limited. The capacity is limited because the surface area is limited to the outer circumferential surface of the filter cartridge. On the other hand, the more common paper filter cartridges have a surface area many times that of spirally wound filters.

Liquid filters commonly use filter paper as a filtering medium. Filter paper is a "surface" filtering media; that is, filter paper removes contaminates from a liquid by acting as a sieve so that the contaminates are held on the outer surface of the filter paper as the liquid passes therethrough. Accordingly, the paper filtering media is comprised of filters which act as a sieve or strainer to hold the contaminate particles on the outer surface. Another type of filtering media is the "depth" type filtering media. Depth-type filtering media include, for example, air laid, nonwoven batts. This type of media has a very porous and open structure and has the desirable characteristic of providing less resistance to fluid flow than does the paper filtering media. Depth-type filtering media readily permit fluid to enter the media and remove particles from the fluid by trapping or entwining the particles in the fibers throughout the entire depth of the media, instead of just on the surface of the filtering media as in the paper-type of filtering media. Of course, the effectiveness of the paper-type filtering media is dependent upon the surface area of the media presented to fluid flow, which is the reason for the limited capacity of the spirally wound filters using the paper filtering media.

The present invention provides a spiral wound liquid filter of a capacity substantially greater than spiral wound filters known in the prior art. This additional capacity is achieved by providing a depth-type filtering media between successive layers of the surface or paper filtering media. This two stage media is wound around the supporting centertube. The depth-type filtering media not only serves to remove contaminate particles from the liquid being filtered, but, since the depth-type filtering media is an open batt-like structure, the depth-type media also functions to maintain the separation between the successive layers of the paper filtering media. Accordingly, the surface area of the paper filtering media presented to the liquid is many times greater than that in prior art spiral wound filters, since if the paper media is wound on its self, the only area presented to the fluid flow is the outer surface of the filter.

A typical prior art spiral wound filter is illustrated in U.S. Pat. No. 2,427,733. This device provides layers of a wood pulp paper with thin tissue paper on opposite surfaces thereof. However, both the tissue paper and the wood pulp paper are both surface-type filtering media, and severely limit both radial and circumferential flow of the liquid through the filter.

Figure 2:
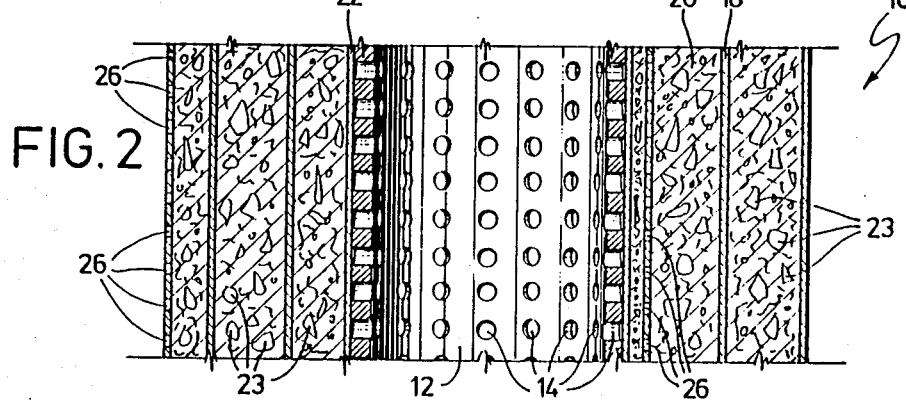
Figure 3:
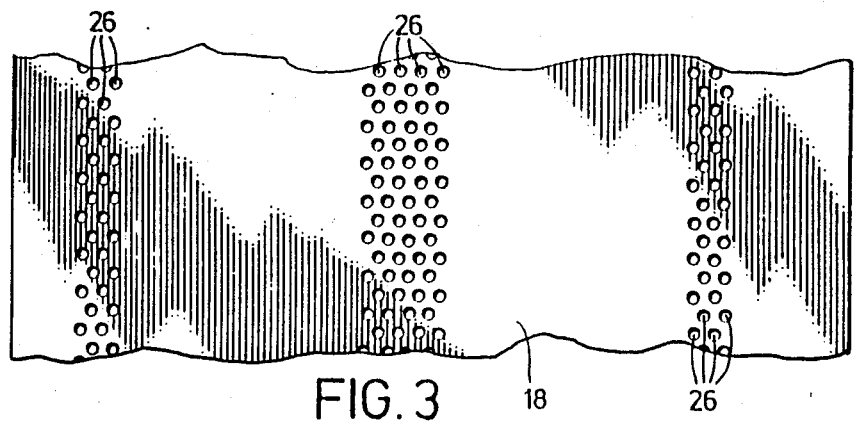

These and other objects of the invention will become apparent from the following description, with reference to the accompanying drawings, in which FIG. 1 is transverse cross-sectional view of a filter cartridge made pursuant to the present invention;

FIG. 2 is an axial cross-sectional view of the cartridge illustrated in FIG. 1 taken substantially along lines 2—2 in FIG. 1; and FIG. 3 is a segment of the strip of filter paper which is provided with optional performations and which is wound into the cartridge illustrated in FIGS. 1 and 2.

Referring now to the drawings, a liquid filter cartridge made pursuant to the teachings of the present invention is indicated by the reference numeral 10. Of course, in practice, the liquid filter cartridge 10 would be equipped with the necessary end caps and would be installed in a metal housing if the filter cartridge is to be used to filter lubricating oil of an internal combustion engine. The necessary valves and connections to the engine would also be provided. However, since none of these conventional features are a part of the present invention, only the cartridge itself is illustrated in the drawings.

The filter cartridge 10 includes a perforated centertube 12 which is perforated as at 14. Filtering media generally indicated by the numeral 16 is wound circumferentially around the centertube 12. The filtering media 16 includes a surface-type paper filtering medium generally indicated by the numeral 18 and a depth-type, batt-like filtering medium generally indicated by the numeral 20. The paper medium 18 is manufactured in the conventional, wet-laid paper making process from wood pulp having a predetermined filtering porosity sized appropriately by the particulate material to be retained. Preferably, the medium 18 may include fine diameter fiberglass fibers to aid in the filtration of smaller particulates. The end portion 22 of the paper medium 18 is wound around the centertube 12 approximately one and one-half times and is sealed to itself as indicated at 24. Preferably, the filter 10 may be wound by first laying out a strip of the paper medium 18 and then laying a strip of the batt-like filtering medium 20 on top of it. However, the batt-like medium 20 will not be placed on that end portion 22 of the paper medium 18 which is wrapped around the centertube 12.

The depth-type, batt-like filtering medium generally indicated by the numeral 20 may be prepared by any conventional air laying process such as the process more fully described in U.S. Pat. No. 4,636,231, in which discrete fibers are blown through a tube and deposited randomly on a foraminous screen. The filtering medium 20 is made from a mixture of fibers of varying diameters. Preferably, the filtering medium or batt 20 includes stiff, relatively large diameter fibers to provide structural rigidity of the medium 20 and to resist compression of the medium 20 to prevent collapse of the layers of the paper medium 18 against one another due to dynamic flow of the liquid filtrate through the filter. The medium 20 also preferably includes relatively smaller diameter fibers which retain particles filtered from the liquid filtrate. Furthermore, discrete clumps of fibers with strong absorbency function indicated at 23 are dispersed throughout the filtering medium 20. These discrete clumps are distributed evenly through the medium 20 but do not project a uniform continuous front to the entering liquid. Preferably, the clumps 22 are clumps of wood pulp fibers. The remaining fibers used in the batt may be of any sutiable type; for example natural fibers such as wood pulp fibers or artifical fibers such as polyester, polyamid, or glass fibers.

Referring again to the medium 18, the outer edge of the medium 18 is sealed to itself as at 24. The portions of the medium 18 other than that wrapped around the centertube 12 are provided with circumferentially spaced openings 26. As illustrated also in FIG. 3, these openings 26 must be spaced such that, when the media 16 is wrapped around the centertube 12 as indicated in FIG. 1, the openings 26 are offset circumferentially from one another on the varying layers of the medium 18 so that the openings 26 do not line up on any single radius extended from the center of the centertube. Of course, that portion of the medium 18 wrapped around the centertube 12 must not have any openings 26 provided therein, because otherwise the fluid filtrate could pass through the filter and into the centertube without having passed through any of the medium 18 except through the openings 26. The purpose of the openings 26 is to provide a flow path so that the liquid filtrate may communicate to the circumferential area of the inner wraps of the medium 18 between the outer wrap 28 and the wrap 22 of the medium 18 around the centertube 12. Of course, if the porosity of the medium 18 is sufficiently high, the holes 26 may be eliminated. However, by providing a fluid path through the outer layers of the medium 18, the liquid filtrate may be distributed over the entire surface area of the medium 18, including the surface area of the intermediate wraps between the outer wrap 28 and the inner wraps 22 of the medium 18. This, of course, enables the entire surface area of the medium 18 to be available for filtration.

In operation, the liquid filtrate first encounters the outer wrap 28 of the medium 18. The filtrate will pass through the medium 18, and some of the particulate contaminates will be sieved from the filtrate and remain on the outer surface of the outer wrap 28. The filtrate will pass through the openings 26 and then will pass through the surface-type medium 18 on one of the wraps in between the outer wrapped 28 and the inner wrap 22. All of the filtrate will pass through the inner wrap 22 before it enters the centertube 12 through the openings 14. The liquid filtrate is then communicated from the centertube 14 through the appropriate openings (not shown) back into the vehicle engine, if the cartrigde 10 is used to filter lubricating oil.

As the liquid passes through the filter, it will also pass through the depth-type medium 20. Some of the particulate contaminates will be entrained in the depth-type medium, and some will be attracted to the clumps of material 22. However, an additional function of the medium 20 is to prevent collapse of the wraps of the medium 18 onto each other. As discussed above, the medium 20 includes relatively larger diameter fibers to provide structural integrity and to resist compression due to the dynamic forces of the liquid passing through the filter. Since the medium 18 is a surface type media, the medium 18 can only act as a filtering medium if the liquid filtrate has access to the surface of the medium. Accordingly, if the wraps of the medium 18 are allowed to collapse upon one another, the inner wraps cannot function as a liquid filter, since their surface area is not available to the liquid filtrate. Accordingly, the depth-type medium 20 not only serves as an auxiliary filter supplementing the action of the surface-type medium 18, but also serves a structural function in preventing collapse of the medium 18. The depth-type medium 20, being an air laid batt, is therefore quite porous and offers a very little resistance to the liquid filtrate. Accordingly, the liquid filtrate can readily pass radially through the medium 20 in a radial direction, but because of the porous nature of the medium 20, little resistance is offered to the filtrate in moving circumferentially around the filter cartridge 10. Accordingly, the depth-type medium 20 permits the liquid filtrate to distribute itself around the surface of the inner wraps of the medium 18.

We claim:

1. Liquid filter cartridge comprising a perforated centertube, and a filtering media wound circumferentially around said centertube, said filtering media comprising a depth type filtering medium between layers of a surface type filtering medium having a predetermined porosity placed on opposite sides of said depth type filtering medium, said depth type filtering medium being relatively uncompressed to have a strength sufficient to maintain separation between the layers of said surface type filtering medium on opposite sides of said depth type filtering medium, and having a porosity sufficiently great to permit relatively uninhibited flow of the liquid within the depth type filtering medium both radially and circumferentially with respect to said centertube, said surface type filtering medium having sections of greater porosity relative to said predetermined porosity, said sections of greater porosity being spaced circumferentially from one another whereby said sections of greater porosity are offset radially from one another on adjacent layers of said surface type filtering medium.

2. Liquid filter cartridge as claimed in claim 1, wherein said depth-type filtering medium is an air laid batt of randomly arranged fibers.

3. Liquid filter cartridge as claimed in claim 2, wherein said surface-type medium is a water laid filter paper.

4. Liquid filter cartridge as claimed in claim 3, wherein said filter paper is wrapped around said centertube at least once whereby all of the perforations in the centertube are covered by said filter paper.

5. Liquid filter cartridge as claimed in claim 4, wherein said cartridge has an outer diameter, said filter paper being wrapped around said outer diameter to define the outer circumferential surface of said cartridge whereby liquid to be filtered first encounters said filter paper as the liquid enters the cartridge.

6. Liquid filter cartridge as claimed in claim 5, wherein the portion of the filter paper wrapped around said centertube is free of perforated sections.

7. Liquid filter cartridge as claimed in claim 2, wherein said batt includes relatively large diameter fibers to provide structural rigidity and resistance to compression and further includes finer fibers having a diameter smaller than the large diameter fibers to aid particulate retention.

8. Liquid filter cartridge as claimed in claim 2, wherein said depth-type filtering medium includes clumps of wood pulp fibers dispersed within said batt.

9. Liquid filter cartridge as claimed in claim 1, wherein said depth-type filtering medium includes clumps of wood pulp fibers dispersed within.

10. Liquid filter cartridge as claimed in claim 1, wherein said sections of greater porosity are defined by perforated sections in said surface type filtering medium, and sections of lesser porosity being defined by sections of said surface type filtering medium having the predetermined porosity which is disposed between said perforated sections.

11. Liquid filter cartridge for filtering a liquid filtrate comprising a perforated centertube, and a filtering media wound circumferentially around said centertube, said filtering media comprising a depth type filtering medium between layers of a surface type filtering medium having a predetermined porosity placed on opposite sides of said depth type filtering medium, said depth type filtering medium being relatively uncompressed to have a strength sufficient to maintain separation between the layers of said surface type filtering medium on opposite sides of said depth type filtering medium, and having a porosity sufficiently great to permit relatively uninhibited flow of the liquid within the depth type filtering medium both radially and circumferentially with respect to said centertube, said surface type filtering media having sections of greater porosity relative to said predetermined porosity, said liquid filtrate being communicated through said surface type filtering media, said sections of greater porosity being spaced circumferentially from one another whereby said sections of greater porosity are offset radially from one another on adjacent layers of said surface type filtering medium, both said sections of greater and predetermined porosity being permeable to said liquid filtrate.

* * * * *